United States Patent [19]

Mueller

[11] Patent Number: 5,686,125
[45] Date of Patent: Nov. 11, 1997

[54] GRANULAR ANIONIC DRY COW PRODUCT

[75] Inventor: Francis J. Mueller, Marion, Ohio

[73] Assignee: Kalmbach Feeds, Inc., Upper Sandusky, Ohio

[21] Appl. No.: 550,615

[22] Filed: Oct. 31, 1995

[51] Int. Cl.⁶ ..................................................... A23K 1/00
[52] U.S. Cl. ............................... 426/74; 426/72; 426/518; 426/807
[58] Field of Search ........................... 426/74, 518, 807, 426/72

[56] References Cited

U.S. PATENT DOCUMENTS

| | | | |
|---|---|---|---|
| 5,098,718 | 3/1992 | Ardaillon et al. | 426/74 |
| 5,215,768 | 6/1993 | Vinci et al. | 426/74 |
| 5,260,089 | 11/1993 | Thornberg | 426/74 |

*Primary Examiner*—Helen Pratt
*Attorney, Agent, or Firm*—Standley & Gilcrest

[57] ABSTRACT

A dry cow feed product is disclosed in which carriers such as corn, barley, wheat and others may be combined with anionic salts, plus other minerals and nutrients, in a granularization process to provide a palatable feed product that is advantageous especially to dairy cows during the dry period.

16 Claims, No Drawings

GRANULAR ANIONIC DRY COW PRODUCT

BACKGROUND AND SUMMARY OF THE INVENTION

The present invention relates generally to animal nutrition, and more particularly, to a granular feed product containing anionic salts in a palatable mixture and form, primarily for consumption by ruminant animals, mainly dry cows.

Proper feeding of farm animals is critical for maintaining their health and maximizing their growth and production. Animals require several supplemental nutrients in addition to nutrients from common feedstuffs to grow and produce at their fullest potential. Unfortunately, many animals prefer to not eat feed products supplemented with certain nutrients to increase the feeds nutritional value because the supplemented nutrient tastes bad to the animal. Another important consideration is the feed quality as it relates to the adequate mixing of supplemental nutrients with grains and other food types so correct proportions of each feedstuff and supplemented nutrient are consumed at required amounts.

One way to provide supplemental nutrients to animals is to mix the nutrients with other feed ingredients. Premixes of minerals and vitamins can be obtained and added to the bulk feed ration fed to the animal. Generally, these premixes are combinations of free flowing meals and powders of different sizes, shapes and densities. The nutrients in these premix products do not remain suspended in the bulk feed ration and tend to separate. It is also difficult to keep the nutrients and bulk feed ration mixed adequately to maintain an even concentration of the nutrients throughout the bulk feed. A solution to this problem is to form processed feed particles containing the nutrients. However, for many farmers the investment in the manufacturing process to produce these products is cost prohibitive.

Dairy cows have a specific dietary need beginning the last week of a pregnancy (dry period) and continuing into the first week of lactation. During this time dairy cows are commonly in a negative calcium balance. This negative balance is a result of the cows inability to increase calcium absorption from the gastro-intestinal tract and increase mobilization of calcium from the bone rapidly enough to meet the calcium demands for milk production. This results in low concentrations of calcium in the blood (hypocalcemia). Hypocalcemia leads to metabolic disorders and other health problem in the lactating cow that result in reduced milk production and poor reproductive performance. Metabolic and health problems associated with hypocalcemia include, milk fever, retained placenta, displaced abomasum (twisted stomach), reduced feed intake, ketosis, uterine infection and decreased body weight.

The present invention is designed to overcome the above-mentioned problems. Recent research has shown the importance of dietary cation-anion difference (DCAD) in preventing hypocalcemia. The DCAD is defined as:

$$\text{meq}[(K+Na)-(Cl+S)]/100g \text{ dietary DM}$$

where: meq=milliequivalent
K=dietary potassium concentration
Na=dietary sodium concentration
Cl=dietary chlorine concentration
S=dietary sulfur concentration
DM=dry matter Due to the high K and Na content of feed stuffs commonly used in dairy rations, the DCAD is typically positive. Feeding diets with negative DCAD during the last three to four weeks of the dry period has been shown to improve the health status of dairy cows after calving. Negative DCAD results in a mild metabolic acidosis, increased mobilization of the calcium from the bone and enhanced calcium absorption from the gastro-intestinal tract. This allows the cow to maintain blood calcium levels and prevent hypocalcemia and its associated ill effects.

The DCAD of dry cow rations is made negative by the addition of anionic salts. These salts include, but are not limited to, calcium sulfate, calcium chloride, magnesium sulfate, magnesium chloride, ammonium sulfate, and ammonium chloride. There are, however, several problems associated with feeding these salts.

Due to their unpalatability anionic salts, in most cases, must be fed in a total mixed ration (TMR) that contains ensiled forages, grains, vitamins and minerals. This makes it difficult for farmers without TMR mixers or with dry forages to feed anionic salts. To feed the anionic salts without a TMR, or with dry forage, they must be mixed into a grain blend with at least an 8 pound feeding rate. This creates a problem in many herds because dry cows do not require 8 pounds of grain. The anionic salts are also highly hygroscopic which results in difficulty when mixing them in TMRs containing ensiled forages. The anionic salts dissolve before they are completely mixed, resulting in a nonuniform mix of the salts. Consequently, the cows tend to be over or under fed. Finally, anionic salts are so hygroscopic they create a handling problem. Within a week after being made, the anionic salt products start to clump together resulting in a hard product that no longer flows. Accordingly, the only way they can be handled is in bags. The product in bags must be broken up by hand before it can be used. This increases labor and causes problems in accurately measuring the amount that needs to be fed.

The present invention of a granular anionic dry cow product addresses and overcomes these problems. With the present invention, anionic salts are combined with grains, vitamins and minerals with a feeding rate of one to six pounds, which is designed to meet the nutrient requirements of the dry cow. Then the combination of anionic salts, grains, vitamins and minerals are granulized. The granularization process enhances palatability to the cow and increases the cows intake of the product. Informal palatability trials have shown that dry cows would eat the granular product and not eat the same product in a nongranular form. The granularization also acts to reduce the hygroscopic nature of the anionic salts. This allows for uniform mixing of the product. The product of the present invention is flowable and can be shipped in bulk rather than in bags, which reduces labor and product measurement problems. The granular product also has the added benefit of preventing separation of other vitamins and minerals when being mixed.

The objects and advantages of the present invention will be further appreciated in light of the following detailed description.

DETAILED DESCRIPTION OF PREFERRED EMBODIMENTS

To supply the anionic salts to the dry cow, feed granules are formed with a preferred combination of grains, vitamins and minerals, and anionic salts in a recipe that equates to a feeding rate of one to six pounds. The feed granules generally have a substantially consistent percentage of anionic salts, grains, and vitamins and minerals in each granule. The granules may further include a carrier and, if necessary, a lubricant and/or binder. A variety of different compositions of ingredients may be used to suit particular applications. For example, the variety of minerals and vitamins incorporated into each granule may vary significantly from herd to herd to meet the nutritional requirements of the cows.

The granularization process reduces the hygroscopic nature of the anionic salts by protecting the salts from exposure to the moisture in the air. During the granularization process a protective shell is formed around each granule due to the gelatinization of the ingredients and a carrier or binder.

In one example of the granularization process for use with the present invention, 30–95% by weight of carrier, such as corn, and 0–70% by weight of minerals and vitamins are combined with 5–70% by weight of anionic salts. The carrier, minerals and vitamins, and salts are mixed, then introduced into a pellet mill processor. In the pellet mill, the mix is subjected to high temperatures to produce pellets. Pellet mills are generally known to those of ordinary skill in the art. Once the mix has been turned into pellets, the pellets are subjected to a crumbier, which may consist of a set of rollers. The pellets are passed between the rollers and the spacing between adjacent rollers is controlled to alter the pellet size and control density. The result of running the pellets through the crumbier is that the pellets are now broken into granules.

The carrier, as mentioned above, can be any of the large number of digestible or nondigestible edible and GRAS (generally recognized as safe) ingredients. These would, for example, include animal protein products, forage products, grain products, plant protein products, processed grain by-products, and roughage products. Some examples of such products are: dried whey, alfalfa meal, barley, corn, rye, oats, wheat, soybean meal, yeast, peanut meal, corn flour, corn gluten feed, sorghum grain flour, wheat red dog, wheat bran, hominy feed, flour and soybean hulls, just to name a few.

A lubricant may also be required. Generally, these will be a fat or oil source such as animal fat, vegetable oil or blended animal and vegetable fat, oilseed processing by-products, soapstock, etc. In certain formulations, a binder may be required. Suitable binders include lignin sulfate, bentonite, and gums as well as others.

These are all combined in desired proportion and pelletized. Generally the nutrient ingredients will form from about one to about 70% of the product and more typically from four to about 40%. If the mineral content is too high, it may not be palatable or peilitable.

Generally, the product will include from about zero to about 5% fat or oil as a lubricant. If the supplement does not include a significant amount of minerals, i.e., greater then 20%, the carrier itself will effectively lubricate and bind itself to form the pellet under the influence of steam used in the pelletizer. On the other hand, if the concentration of minerals exceeds 20%, about 0.5–1% fat per 10% mineral above 20% should be added. Accordingly, if the product includes 40% mineral ingredients (as opposed to nutrient), 1–2% fat should be included.

In producing the pellets of the present invention, the components are blended in any blending apparatus. The product is pelletized by running it through a pellet mill. Pellet mills are, of course, very well known. Several suitable pellet mills are those made by Sprout-Waldron and California pellet mill. The pellets can be formed of a variety of different sizes. Generally, the pellet size will be from about 9/64 up to about 32/64 of an inch. More typically, the pellets will be from about 8/64 to about 12/64 of an inch in size.

The formed pellets are cooled through coolers which are generally used with the pellet mill and manufactured by the same companies and ground with a roller mill or crumbier to form granules. The pellets are then screened and separated for size. The coolers and roller mills and crumblers are likewise well known. The size of granules will depend upon the ultimate use, but will generally be in the neighborhood of about 1/64 up to about 12/64 of an inch at their greatest dimension. The sizes, of course, are average sizes.

The density of the formed granules should be equal to the bulk feed to which they are expected to be added, plus or minus 30%. Density can be controlled by increasing the carrier concentration, modification of the carrier concentration as well as adjusting parameters within the pelletizer itself such as pressure, steam and temperature as well as ultimate granule size.

One preferred embodiment of the present invention includes the following ingredients:

| Ingredient | Percent by Weight |
| --- | --- |
| Bakery Meal | 0–25% |
| Corn Gluten Meal | 0–25% |
| Fish Meal | 0–25% |
| Blood Meal | 0–25% |
| Dicalcium Phosphate | 0–25% |
| Calcium Carbonate | 0–30% |
| Tallow | 0–10% |
| Salt | 0–15% |
| Wheat Middlings | 0–50% |
| Ammonium Chloride | 0–10% |
| Calcium Sulfate | 0–10% |
| Magnesium Chloride | 0–10% |
| Calcium Chloride | 0–15% |
| Ammonium Sulfate | 0–15% |
| Magnesium Sulfate | 0–15% |
| Trace Mineral | 1–5% |
| Vitamins | 1–5% |

The pellets may be formulated using an operating temperature of about 130 F. to 200 F., and preferably 160 F. to about 170 F., with a steam pressure of about 5 to 100 psi, preferably 30 to 60 psi. When the mineral concentration exceeds 20% of the formulation, higher steam pressure is usually used, i.e., 40 to 80 psi. Of course, these are preferred parameters for this formulation and other formulations would be modified which would be readily apparent to one of ordinary skill in the art.

Thus, by forming the granulized anionic dry cow product of the present invention, the product is in a size, density, concentration, ingredient recipe, and taste that will be palatable to an animal and supply the nutrient needs of the animal, without either overfeeding the animal or under supplying the needs of the animal. The present invention is flexible in that a variety of different formulas can be prepared which are uniquely designed for the needs of particular animals, such as dairy cows in the dry period.

The granularization of the dry cow feed product of the present invention, causes the product not to immediately dissolve on the cows tongue but, instead, dissolves in the cows digestive system This keeps the strong anionic salt taste from being sensed by the tastebuds of the cows tongue which actually results in the cow being fooled as to the content of the granules being eaten. With the use of the present invention, the cow will feel well fed yet not have the negative side effects of the strong taste sensation that accompanies anionic salts.

The present invention has been described in a preferred embodiment. However, several modifications and variations of the invention may be incorporated and still fall within the scope of the following claims.

What is claimed is:

1. A feed product for animals, comprising:

a carrier;

anionic salts mixed with said carrier; and minerals and vitamins mixed with said carrier and said anionic salts to form a granular feed product wherein the concentration of said carrier and said anionic salt is substantially consistent throughout every granular and wherein said granular feed product is flowable and can be shipped in bulk, wherein said carrier and said anionic salts are combined in a formula that is effective for a one to six pound feeding portion per animal.

2. The product of claim 1, further comprising:

a binder mixed with said carrier and said anionic salts in forming each said granule.

3. The product of claim 2, wherein said binder can include: lignin sulfate, bentonite, and gums.

4. The product of claim 2, wherein a protective shell is formed around each said granule due to the gelatinization of said ingredients and said carrier or binder.

5. The product of claim 2, wherein the nutrient ingredients will form from about 1 to 70% of the product.

6. The product of claim 1, wherein said carrier and said anionic salts are in a pellet form prior to being converted to said granular feed product.

7. The product of claim 1, wherein said anionic salts can include: calcium sulfate, calcium chloride, magnesium sulfate, magnesium chloride, ammonium sulfate, and ammonium chloride.

8. The product of claim 1, wherein said granular feed product dissolves in said animals digestive system which keeps the strong anionic salt taste from being sensed by the tastebuds of said animal.

9. The product of claim 1, wherein said carrier can be any of the large number of digestible and nondigestable edible and GRAS ingredients.

10. The product of claim 9, wherein said ingredients may include: animal protein products, forage products, grain products, plant protein products, processed grain by-products, and roughage products.

11. The product of claim 1 further comprising: a lubricant, wherein said lubricant is a fat or oil source.

12. The product of claim 11, wherein said feed product will include about 0–10% fat oil as a lubricant.

13. The product of claim 1, wherein the density of said formed granules is equal to the bulk feed to which said granules are expected to be added, plus or minus 30%.

14. The product of claim 1, wherein said minerals and vitamins are chosen to meet the specific nutritional requirements of the animals.

15. A feed product for animals, comprising:

a carrier; and anionic salts mixed with said carrier to form a granular feed product wherein the concentration of said carrier and said anionic salt is substantially consistent throughout every granular and wherein said granular feed product is flowable and can be shipped in bulk, wherein a dietary cation-anion difference, calculated as follows:

$$meq[(K+Na)-(Cl+S)]/100 \text{ g dietary DM}$$

where: meq=milliequivalent
K=dietary potassium concentration
Na=dietary sodium concentration
Cl=dietary chlorine concentration
S=dietary sulfur concentration
DM=dry matter, is negative.

16. A feed product for dry cows, comprising:

a plurality of granules, each of said granules ranging in size from about 1/64 inch up to about 12/64 inch, wherein each of said granules comprises a carrier forming from about 30% to about 95% by weight of each of said granules, at least one anionic salt forming from about 5% to about 70% by weight of each of said granules, and at least one mineral or vitamin forming from about 0.5% to about 65% by weight of each of said granules, wherein the density of said granules is equal to the density of the bulk feed to which said granules are expected to be added, plus or minus 30%, and wherein said granular feed product is flowable and can be shipped in bulk, whereby said feed product is administered in a per cow feeding rate of about 1 lb. to about 6 lbs., wherein a dietary cation-anion difference, calculated as follows:

$$meq[(K+Na)-(Cl+S)]/100 \text{ g dietary DM}$$

where: meq=milliequivalent
K=dietary potassium concentration
Na=dietary sodium concentration
Cl=dietary chlorine concentration
S=dietary sulfur concentration
DM=dry matter, is negative.

* * * * *

UNITED STATES PATENT AND TRADEMARK OFFICE
CERTIFICATE OF CORRECTION

PATENT NO. : 5,686,125
DATED : November 11, 1997
INVENTOR(S) : Francis J. Mueller It is certified that error appears in the above-identified patent and that said Letters Patent is hereby corrected as shown below:

In column 1, line 46, please delete the word "problem" and replace it with -- problems --.

In column 3, line 20, please delete the word "crumbier" and replace it with -- crumbler --.

In column 3, line 24, please delete the word "crumbier" and replace it with -- crumbler --.

In column 3, line 40, please delete the word "bentonitc" and replace it with -- bentonite --.

In column 3, line 46, please delete the word "peilitable" and replace it with -- pellitable --.

In column 4, line 1, please delete the word "crumbier" and replace it with -- crumbler --.

In column 5, line 8, please delete the word "granular" and replace it with -- granule --.

In column 5, line 17, please delete the word "bentonitc" and replace it with -- bentonite --.

In column 5, line 44, after the word "fat", please insert -- or --.

UNITED STATES PATENT AND TRADEMARK OFFICE
CERTIFICATE OF CORRECTION

PATENT NO. : 5,686,125
DATED : November 11, 1997
INVENTOR(S) : Francis J. Mueller It is certified that error appears in the above-identified patent and that said Letters Patent is hereby corrected as shown below:

In column 6, line 9, please delete the word "granular" and replace it with -- granule --.

Signed and Sealed this

Twenty-fourth Day of February, 1998

*Attest:*

*Attesting Officer*

BRUCE LEHMAN

*Commissioner of Patents and Trademarks*